United States Patent
White et al.

(10) Patent No.: US 7,559,521 B2
(45) Date of Patent: Jul. 14, 2009

(54) BRACKET FOR ANTI-LOCK BRAKING SYSTEM SENSOR

(75) Inventors: Jay D. White, Massillon, OH (US); John M. Suffron, N. Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 1254 days.

(21) Appl. No.: 10/152,893

(22) Filed: May 21, 2002

(65) Prior Publication Data

US 2002/0175258 A1    Nov. 28, 2002

Related U.S. Application Data

(60) Provisional application No. 60/293,079, filed on May 23, 2001.

(51) Int. Cl.
*A47F 5/00* (2006.01)
*B60T 8/72* (2006.01)

(52) U.S. Cl. .................. 248/314; 73/493; 73/866.5; 188/181 A; 188/181 R; 248/74.1; 248/83; 301/105.1; 301/124.1

(58) Field of Classification Search .................. 248/314, 248/205.3, 230.1, 205.4; 301/105.1, 124.1; 303/121; 188/181 A, 181 R; 73/493, 494, 73/866.5; 482/74.1, 74.3, 80, 83, 309.1, 482/314, 230.1, 230.8, 315
See application file for complete search history.

(56) References Cited

U.S. PATENT DOCUMENTS

| | | | | | |
|---|---|---|---|---|---|
| 1,097,746 | A | * | 5/1914 | Benton | 248/80 |
| 1,140,145 | A | * | 5/1915 | Finger | 248/83 |
| 2,003,837 | A | * | 6/1935 | Skoglund | 248/83 |
| 3,510,918 | A | * | 5/1970 | Oetiker | 24/19 |
| 3,887,046 | A | * | 6/1975 | Bueler | 188/181 A |
| 4,132,293 | A | * | 1/1979 | Jovick | 188/181 R |
| 4,220,243 | A | | 9/1980 | Frost et al. | |
| 4,877,209 | A | * | 10/1989 | Gary | 248/205.3 |
| 5,148,104 | A | * | 9/1992 | Ishikawa | 324/173 |
| 5,184,792 | A | | 2/1993 | Bernhard et al. | |
| 5,650,720 | A | | 7/1997 | Brockmuller et al. | |

(Continued)

FOREIGN PATENT DOCUMENTS

EP    0 921 398 A1    6/1999

(Continued)

*Primary Examiner*—J. Allen Shriver
*Assistant Examiner*—Tan Le
(74) *Attorney, Agent, or Firm*—Krugliak, Wilkins, Griffiths & Dougherty Co., LPA; David P. Dureska; Edward T. Kennedy

(57) ABSTRACT

A bracket for securely positioning an anti-lock braking system sensor on a heavy-duty vehicle axle adjacent to wheel hub tone ring teeth is formed from a single piece of robust material such as sheet steel. A steel blank of a certain size and shape preferably is stamped from the sheet steel and is formed by a multi-stage process into the final bracket configuration. The bracket includes a tubular portion formed with a continuous opening for receiving the sensor and a retaining sleeve. A pair of spaced-apart, parallel rearwardly extending bracket feet ensure proper positioning of the sensor relative to the tone ring teeth, and enable use of the bracket in various applications having different wheel hub and/or axle spindle configurations.

4 Claims, 3 Drawing Sheets

U.S. PATENT DOCUMENTS

| | | | |
|---|---|---|---|
| 5,704,692 A * | 1/1998 | Purdy et al. | 301/105.1 |
| 6,238,015 B1 * | 5/2001 | Garcia et al. | 303/121 |
| 6,286,638 B1 * | 9/2001 | Rowan et al. | 188/181 A |
| 6,523,425 B1 * | 2/2003 | Kubik | 73/866.5 |
| 6,929,332 B2 * | 8/2005 | Naslund et al. | 301/124.1 |
| 2002/0175258 A1 * | 11/2002 | White et al. | 248/314 |

FOREIGN PATENT DOCUMENTS

| | | | |
|---|---|---|---|
| JP | 10-297457 | * | 10/1998 |
| JP | 2000-108862 | * | 4/2000 |

* cited by examiner

BRACKET FOR ANTI-LOCK BRAKING SYSTEM SENSOR

CROSS-REFERENCE TO RELATED APPLICATION

This application claims the benefit of U.S. Provisional Patent Application Ser. No. 60/293,079, filed May 23, 2001.

BACKGROUND OF THE INVENTION

1. Field of the Invention

The invention relates to means for mounting an anti-lock braking system sensor, hereinafter referred to as an "ABS" sensor, adjacent to a tone ring of a wheel hub, and in particular to a bracket for mounting the ABS sensor on an axle of a heavy-duty vehicle such as a semi-trailer or straight truck. More particularly, the invention is directed to an ABS sensor bracket made by forming a single piece of robust material into a tubular configuration for locating a retaining sleeve and the ABS sensor in a proper position relative to the wheel hub for sensing rotation of the hub tone ring teeth, thereby eliminating the need for more costly brackets heretofore formed by casting, machining, or fabrication and welding of multiple parts.

2. Background of the Invention

In recent years, anti-lock braking systems, more commonly referred to as ABS, have become common safety equipment on every type of vehicle ranging from cars to semi-trailers. In heavy-duty vehicles such as straight trucks and semi-trailers, government regulations require at least one axle of the tandem axles commonly found on such vehicles, to include an ABS sensor on each end of that axle. Some manufacturers of such heavy-duty vehicles go beyond government regulations and include the ABS sensors on every axle to improve ABS performance.

Each ABS sensor must be located adjacent to the inboard facing side of the wheel hub which incorporates a tone ring having teeth formed thereon. As is well-known to those skilled in the art, such sensors detect certain movements of the teeth on the tone ring, which in turn causes an electrical signal to be sent to the ABS electronic control unit enabling control of brake engagement. Thus, it is important that the ABS sensor be precisely positioned on the vehicle axle inboardly adjacent to and aligned with the tone ring teeth so that it can properly perform its sensing function.

Prior art brackets which attach to the axle and position the ABS sensor adjacent to the wheel hub tone ring have heretofore been made in one of three ways. Specifically, such brackets either typically were cast, formed from heavy blocks of metal by machining, or made from multiple parts which required fabrication and welding to form the bracket. Each of these methods of forming an ABS sensor bracket carried a cost penalty. Moreover, a custom bracket design generally had to be made for each application having a different wheel hub and/or spindle configuration. For example, one design might be required for a tapered spindle and another design for a straight spindle.

The present invention solves the cost problem associated with prior art ABS sensor brackets by forming the bracket from a single piece of robust material such as sheet steel which can be efficiently folded into a generally tubular-shaped bracket for holding the ABS sensor in its proper position on the vehicle axle adjacent to the wheel hub tone ring. The present invention bracket design carries the additional advantage of being useful on different wheel hub and/or spindle applications.

SUMMARY OF THE INVENTION

Objectives of the present invention include providing a bracket for an ABS sensor which can be manufactured relatively inexpensively.

Another objective of the present invention is to provide such an ABS sensor bracket which enables easy mounting of the ABS sensor, and which itself is easily mounted on a vehicle axle adjacent to a wheel hub tone ring.

Yet another objective of the present invention is to provide such an ABS sensor which is useful with various wheel hub and/or spindle configurations.

Still another objective of the present invention is to provide such an ABS sensor bracket which is relatively lightweight, durable in use, easy to maintain and replace, and can be economically produced in large volumes.

These objectives and advantages are obtained by the bracket of the present invention for positioning sensor means on a vehicle axle adjacent to a wheel hub tone ring, the general nature which may be stated as including, means for capturing the sensor means, and at least one foot attached to the capture means for contacting an exterior surface of the axle to insure proper location of the sensor means on the axle adjacent to the wheel hub tone ring for sensing movement of the tone ring.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
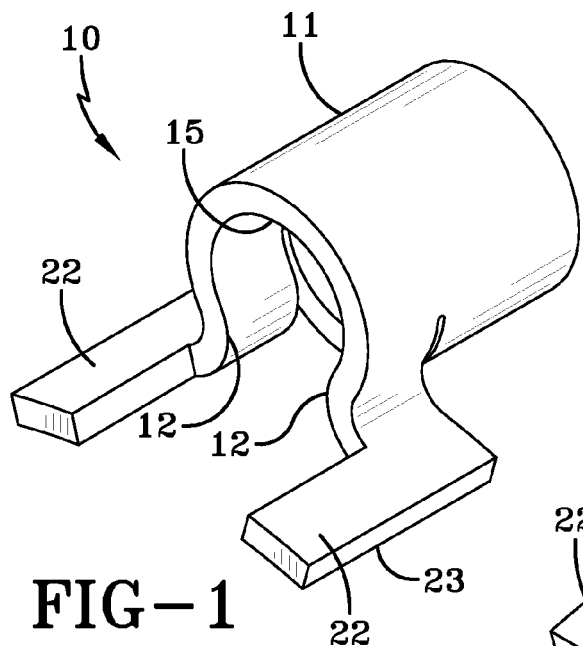
FIG. 1 is a rear-end perspective view of the ABS sensor bracket of the present invention.
Figure 2:
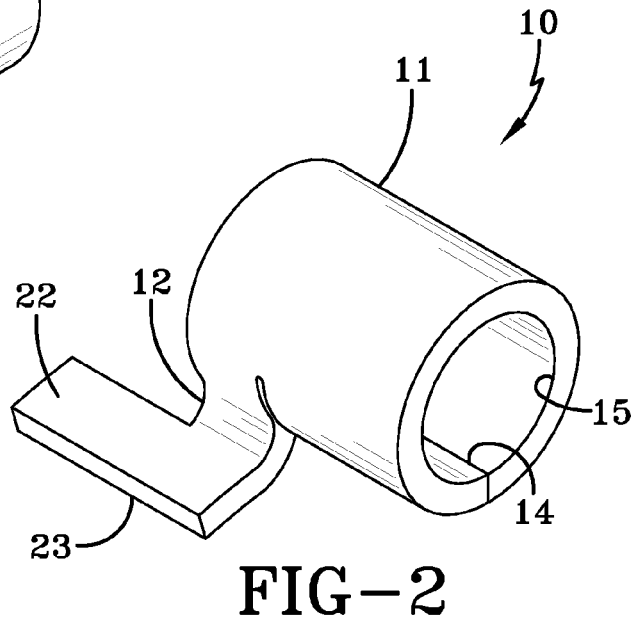
FIG. 2 is a front-end perspective view of the ABS sensor bracket shown in FIG. 1.
Figure 3:
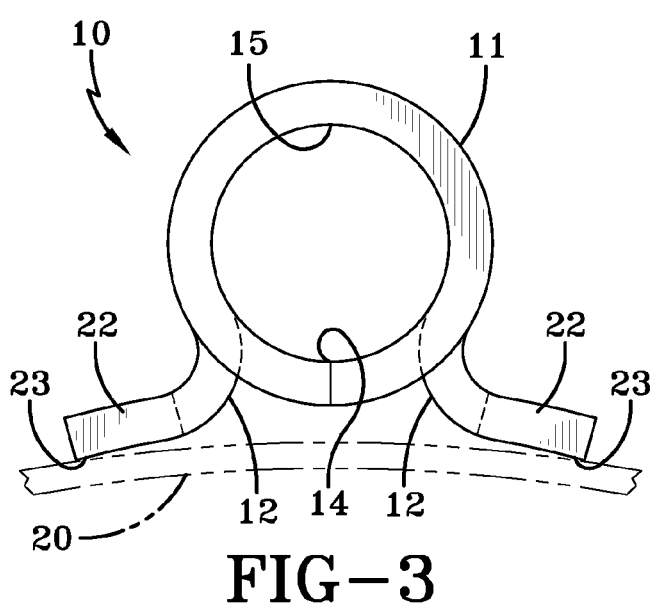
FIG. 3 is a front-end view of the ABS sensor bracket of FIGS. 1 and 2, with hidden parts represented by broken lines, and shown positioned on a vehicle axle represented in fragmentary form and by phantom lines.
Figure 4:
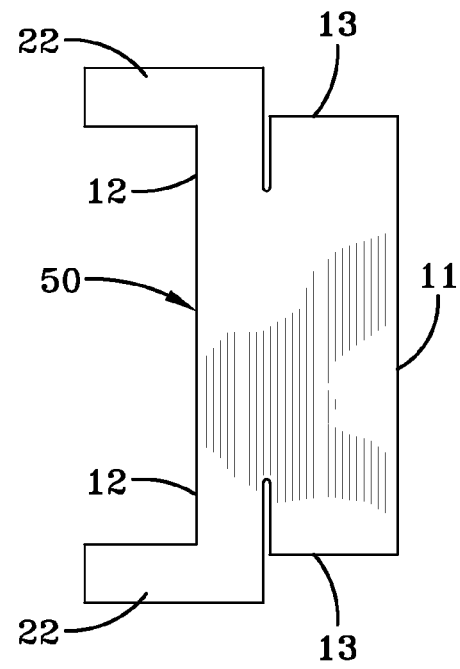
FIG. 4 is a top plan view of a steel blank used to form the ABS sensor bracket, but prior to folding the steel to form the bracket, and after it has been stamped from sheet steel.

The ABS sensor bracket of the present invention is indicated generally at 10 and is shown in FIGS. 1-3. Bracket 10 preferably is formed from a piece of sheet steel having a thickness of from about 0.06 to about 0.15 inches, and preferably about 0.13 inches. A steel blank 50 having the configuration and size shown in FIG. 4 is cut from the sheet of steel, preferably by stamping. Bracket 10 then is formed into its final shape by folding steel blank 50 into the configuration shown in FIGS. 1-3, preferably by a multi-stage forming process using a single or multiple presses.

More specifically, formed bracket 10 includes a tubular portion 11 and a pair of spaced apart rear legs 12 which each extend generally sidewardly downwardly from the tubular portion. Each leg 12 in turn is formed with a rearwardly extending foot 22. Tubular portion 11 is formed into a continuous circular structure having a continuous opening 15 by joining lower opposed edges 13 at seam 14, preferably by a resistance weld (not shown). However, it is understood that lower edges 13 could be left open or slightly spaced-apart and free of welds, without affecting the overall inventive concept.

Figure 5:
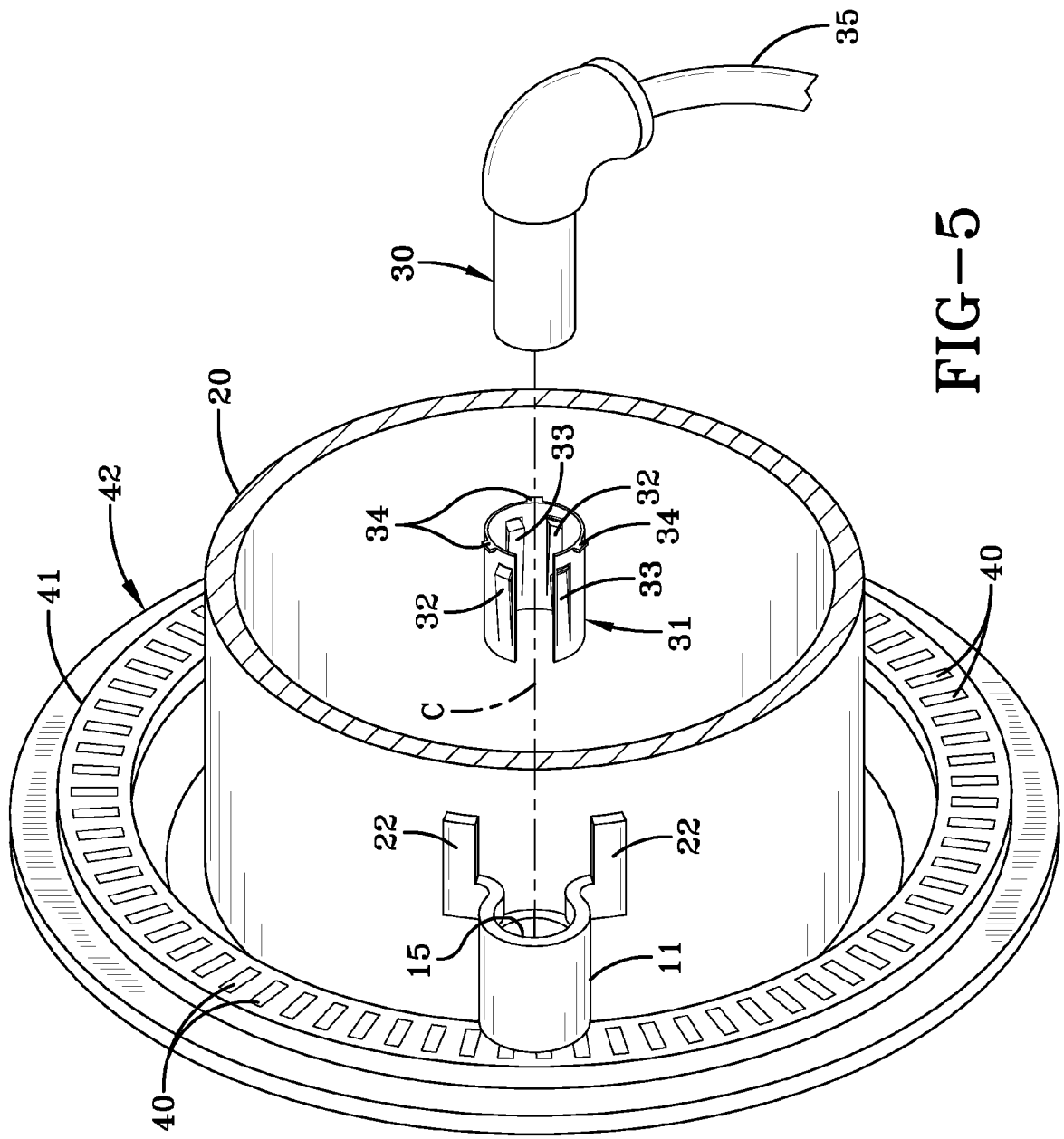
FIG. 5 is a perspective view, looking generally in the outboard direction, showing an ABS bracket mounted on an axle section adjacent to a wheel hub tone ring, and further showing in exploded fragmentary format an ABS sensor and a retaining sleeve for mounting in the bracket.

As best shown in FIGS. 3 and 5, when bracket 10 is positioned on an axle 20, the lowermost portion of the bottom surface of each foot 22, hereinafter referred to as edge 23, contacts the outermost or exterior surface of the axle. Bracket 10 is attached to axle 20 preferably using a MIG weld (not shown), which is well-known in the art and adds a filler metal at the contact points between each foot edge 23 and axle 20. However, it is understood that other types of welding could be utilized such as TIG welding which would utilize a portion of the material forming each bracket foot edge 23 and a portion of the material forming axle 20 at the point where the feet edges contact the axle to create the weld between bracket 10 and the axle.

An ABS sensor 30 is captured or mounted in bracket 10 in the following manner. A retaining sleeve 31 which is well-known in the art and typically supplied by the ABS sensor manufacturer, is first mounted in opening 15 of bracket 10. Sleeve 31 conventionally is formed of beryllium copper, and includes a plurality of outwardly and inwardly biased protuberances 32 and 33, respectively. A plurality of vertically extending stops 34 are formed along the periphery of the rear end of retaining sleeve 31. The front end of sleeve 31 thus is pushed into the rear end of bracket continuous opening 15 until stops 34 contact the rear edge of tubular portion 11. Sleeve 31 preferably is approximately the same length as tubular portion 11 and has a slightly smaller outside diameter than the inside diameter of the tubular portion, and is securely held therein by an interference fit crated by the outward bias of protuberances 32 bearing against the interior surface of the tubular portion.

ABS sensor 30, which is cylindrical-shaped and has a length similar to that of bracket tubular portion 11 and retaining sleeve 31, then can be mounted within bracket 10 and the sleeve. More particularly, ABS sensor 30 has an outside diameter slightly smaller than the inside diameter of sleeve 31, but when pushed into the rear end of sleeve 31 is held securely therein by an interference fit created by the inward bias of protuberances 33 bearing against the exterior surface of the sensor. An electrical conduit or cable 35 extends from the rear end of sensor 30 and electrically connects the sensor to the ABS electronic control unit (not shown) in a well-known manner. More specifically, ABS sensor 30 senses certain movements of teeth 40 on tone ring 41 of wheel hub 42, and relays such information to the electronic control unit which in turn enables control of brake engagement.

Thus, in accordance with one of the important features of the present invention, it clearly can be seen and understood that the design of bracket 10 enables precise positioning of a centerline C of bracket tubular portion 11 a certain height from the centerline (not shown) of axle 20 to ensure proper vertical disposition of ABS sensor 30 in relation to wheel hub tone ring teeth 40. Moreover, feet 22, and more particularly elongated parallel feet edges 23, contact the curved periphery of axle 20 in such a way so as to ensure a parallel self-alignment or squaring of the outboard sensing face (not shown) of sensor 30 with the inboard faces of tone ring teeth 40 when sufficient normal pressure is placed on bracket 10 against axle 20 during installation of the bracket. Rearwardly extending feet 22 also provide more flexibility for positioning bracket 10 in various vehicle applications having different hub and/or spindle configurations, such as those applications having tapered or stepped spindles.

Figure 6:
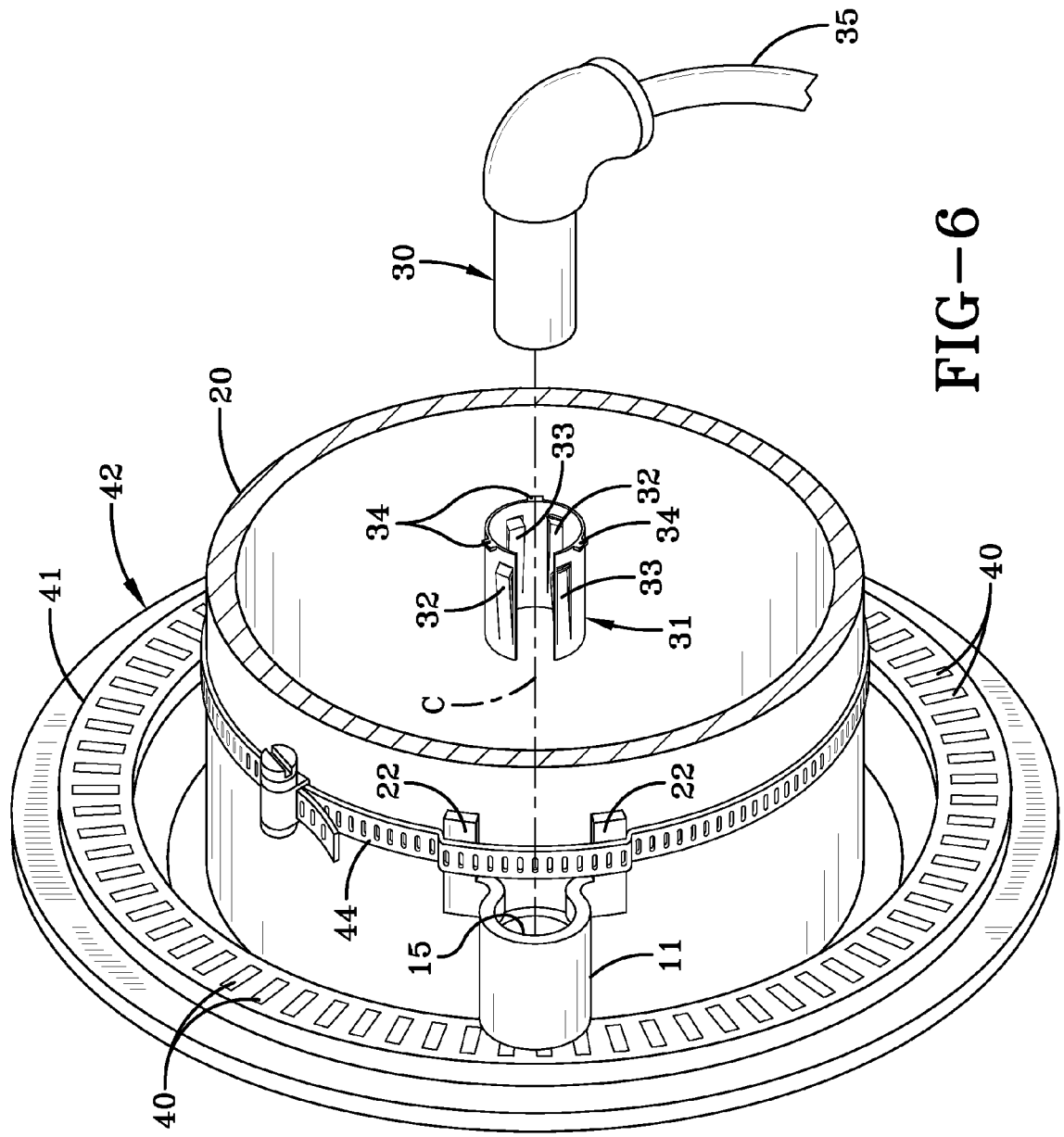
FIG. 6 is a perspective view of the ABS bracket, axle section, wheel hub tone ring, ABS sensor and retaining sleeve that are shown in FIG. 5, shown with a band clamp securing the bracket to the axle.

It is understood that the configuration and size of bracket 10 shown and described herein is intended for use with an axle having an outside diameter of 5¾ inches. However, the size of the axle with which ABS sensor bracket 10 of the present invention is utilized does not affect the overall concept of the present invention, and it is contemplated that the size and/or shape of bracket 10 could be modified for use with other diameter axles to similarly properly position an ABS sensor on the axle adjacent to a wheel hub tone ring. In addition, it is further contemplated that bracket 10 could be configured to have only one leg and one foot. For example, if the single foot was wide enough, it could achieve the self-alignment or squaring function in a fashion similar to that achieved by dual feet 22 of the preferred embodiment of the present invention. It is also contemplated that bracket 10 could be formed of other sturdy materials, and that blanks 50 could be formed by methods other than stamping, and the folding into the final shape of bracket 10 could be performed utilizing a different number of process steps and using different equipment than those described hereinabove as being preferred. It is further understood that alternatives for securing bracket 10 to an axle could be utilized, such as employing a band clamp 44 (FIG. 6) on feet 22 instead of welds.

It is also understood that bracket 10 could be utilized to hold other sensors which perform other functions, such as a vehicle backup sensor, which senses rearward movement of wheel hub tone ring 41 and relays that information to an alarm which provides an audible sound to warn people of the backing vehicle. Thus, a second one or more additional brackets could be mounted on axle 20 in the same manner as ABS sensor bracket 10 without affecting the overall concept of the present invention.

Thus, it can be seen that ABS sensor bracket 10 of the present invention overcomes the problems associated with prior art ABS sensor brackets which conventionally utilized either a casting process, extensive machining of heavy metal blocks, or fabrication and welding of multiple parts, to produce a lower cost, efficient bracket which achieves all the enumerated objectives.

Accordingly, the improved ABS sensor bracket and method of manufacture of the present invention is simplified, provides an effective, safe, inexpensive, and efficient device which achieves all of the enumerated objectives, provides for eliminating difficulties encountered with prior ABS sensor brackets, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved ABS sensor bracket is constructed, arranged and used, the characteristics of the construction and arrangement, and the advantageous, new and useful results obtained; the new and useful processes, structures, devices, elements, arrangements, parts and combinations are set forth in the appended claims.

What is claimed is:

1. A bracket for positioning sensor means on a vehicle axle adjacent to a wheel hub tone ring, said bracket including:
   a) means for capturing said sensor means, said capture means being a tubular portion of said bracket formed with a continuous opening, and a pair of legs each extending generally sidewardly downwardly from said tubular portion; and
   b) a pair of feet, each foot being attached to and extending generally sidewardly downwardly and rearwardly from a respective one of said legs, and each foot being welded to an exterior surface of said axle by a MIG weld, for contacting an exterior surface of said axle to ensure proper location of said sensor means on the axle adjacent to said wheel hub tone ring for sensing movement of the tone ring.

2. A bracket for positioning sensor means on a vehicle axle adjacent to a wheel hub tone ring, said bracket including:
   a) means for capturing said sensor means, said capture means being a tubular portion of said bracket formed with a continuous opening, and a pair of legs each extending generally sidewardly downwardly from said tubular portion; and
   b) a pair of feet, each foot being attached to and extending generally sidewardly downwardly and rearwardly from a respective one of said legs, and each foot being welded to an exterior surface of said axle by a TIG weld, for contacting an exterior surface of said axle to ensure proper location of said sensor means on the axle adjacent to said wheel hub tone ring for sensing movement of the tone ring.

3. A bracket for positioning sensor means on a vehicle axle adjacent to a wheel hub tone ring, said bracket including:
   a) means for capturing said sensor means, said capture means being a tubular portion of said bracket formed with a continuous opening, and a pair of legs each extending generally sidewardly downwardly from said tubular portion; and
   b) a pair of feet, each foot being attached to and extending generally sidewardly downwardly and rearwardly from a respective one of said legs, said bracket being attached to said axle with a band clamp, said clamp capturing said feet against said axle, for contacting an exterior surface of said axle to ensure proper location of said sensor means on the axle adjacent to said wheel hub tone ring for sensing movement of the tone ring.

4. A bracket for positioning sensor means on an axle of a vehicle adjacent to a wheel hub tone ring, said vehicle having a pair of spaced-apart outboard sides, and said tone ring being oriented in an inboard direction relative to its respective one of said pair of vehicle outboard sides, said bracket for said vehicle axle including:
   a) means for capturing said sensor means, said capture means being a tubular portion of said bracket formed with a continuous opening, and a pair of legs each extending generally sidewardly from said tubular portion in a direction of said axle; and
   b) a pair of feet, each foot being connected to and extending generally inboardly from a respective one of said legs and being offset inboardly from said capture means, each foot further being attached to an exterior surface of said axle with a band clamp that captures said feet against the axle, for locating the sensor means on said axle adjacent to the wheel hub tone ring for sensing movement of said tone ring.

\* \* \* \* \*